(12) United States Patent
Wang

(10) Patent No.: US 8,856,845 B2
(45) Date of Patent: Oct. 7, 2014

(54) METHOD AND SYSTEM FOR PROVIDING PERSONALIZED CONTENTS

(71) Applicant: Haohong Wang, San Jose, CA (US)

(72) Inventor: Haohong Wang, San Jose, CA (US)

(73) Assignee: TCL Research America Inc., San Jose, CA (US)

(*) Notice: Subject to any disclaimer, the term of this patent is extended or adjusted under 35 U.S.C. 154(b) by 0 days.

(21) Appl. No.: 13/726,001

(22) Filed: Dec. 21, 2012

(65) Prior Publication Data

US 2014/0181878 A1    Jun. 26, 2014

(51) Int. Cl.
| | |
|---|---|
| H04H 60/33 | (2008.01) |
| H04N 7/10 | (2006.01) |
| H04N 7/025 | (2006.01) |
| G06F 3/00 | (2006.01) |
| G06F 13/00 | (2006.01) |
| H04N 5/445 | (2011.01) |
| H04N 21/25 | (2011.01) |

(52) U.S. Cl.
CPC ................... *H04N 21/252* (2013.01)
USPC .......... 725/87; 725/9; 725/11; 725/34; 725/46

(58) Field of Classification Search
CPC ... H04H 2201/90; H04H 60/31; H04H 60/33; H04H 60/37; H04H 60/45; H04H 60/56; H04N 21/44222; H04N 21/4532; H04N 21/25891; H04N 21/4667; H04N 21/4668; H04N 21/4826

USPC ....................... 725/9–11, 15, 34, 46
See application file for complete search history.

(56) References Cited

U.S. PATENT DOCUMENTS

| | | |
|---|---|---|
| 2002/0194586 A1 | 12/2002 | Gutta et al. |
| 2005/0144632 A1* | 6/2005 | Mears et al. ................ 725/15 |
| 2007/0266395 A1* | 11/2007 | Lee et al. .................... 725/11 |
| 2008/0059988 A1* | 3/2008 | Lee et al. ..................... 725/9 |
| 2009/0070797 A1* | 3/2009 | Ramaswamy et al. ...... 725/10 |
| 2012/0060176 A1 | 3/2012 | Chai et al. |
| 2012/0167127 A1* | 6/2012 | Uchida et al. .............. 725/14 |
| 2012/0204201 A1 | 8/2012 | Cassidy et al. |
| 2013/0291031 A1* | 10/2013 | Dow et al. .................. 725/93 |

\* cited by examiner

*Primary Examiner* — Mark D Featherstone
*Assistant Examiner* — Jen-Shi Huang
(74) *Attorney, Agent, or Firm* — Anova Law Group, PLLC

(57) ABSTRACT

A method is provided for a personalized content delivery system. The method includes detecting a viewing activity of at least one user of a content-presentation device capable of presenting multiple programs in one or more channels, and determining a plurality of user identities of the at least one user. The method also includes discovering available video contents for the at least one user based on the plurality of user identities, and determining personalized video contents for the at least one user by merging the plurality of user identities. Further, the method includes recommending the determined personalized video contents to the at least one user, and delivering the recommended personalized video contents to the at least one user such that the personalized video contents are presented on the content-presentation device.

10 Claims, 4 Drawing Sheets

METHOD AND SYSTEM FOR PROVIDING PERSONALIZED CONTENTS

FIELD OF THE INVENTION

The present invention relates to the field of television and user interface technologies and, more particularly, to techniques for providing personalized contents to users.

BACKGROUND

In the United States, certain premium cable TV network channels are very popular, because those channels often are commercial free and offer premium TV programs attractive to most TV viewers. However, considering millions viewers watching the fixed identical programs simultaneously, personalization technology may be needed to open a door for audiences to make their TV watching experience more versatile. On the other hand, the premium-based model used by the cable TV network may be expensive to the viewers in light of available technologies such as content discovery technologies and on-demand streaming video technologies.

The disclosed methods and systems are directed to solve one or more problems set forth above and other problems.

BRIEF SUMMARY OF THE DISCLOSURE

One aspect of the present disclosure includes a method for a personalized content delivery system. The method includes detecting a viewing activity of at least one user of a content-presentation device capable of presenting multiple programs in one or more channels, and determining a plurality of user identities of the at least one user. The method also includes discovering available video contents for the at least one user based on the plurality of user identities, and determining personalized video contents for the at least one user by merging the plurality of user identities. Further, the method includes recommending the determined personalized video contents to the at least one user, and delivering the recommended personalized video contents to the at least one user such that the personalized video contents are presented on the content-presentation device.

Another aspect of the present disclosure includes personalized content delivery system. The personalized content delivery system includes a viewer discovery module, a streaming source discovery module, a recommendation engine, and a video stream renderer. The viewer discovery module is configured to detect a viewing activity of at least one user of a content-presentation device capable of presenting multiple programs in one or more channels, and to determine a plurality of user identities of the at least one user. The streaming source discovery module is configured to discover available video contents for the at least one user based on the plurality of user identities. The recommendation engine is configured to determine personalized video contents for the at least one user by merging the plurality of user identities, and to recommend the determined personalized video contents to the at least one user. Further, the video stream renderer is configured to deliver the recommended personalized video contents to the at least one user such that the personalized video contents are presented on the content-presentation device.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
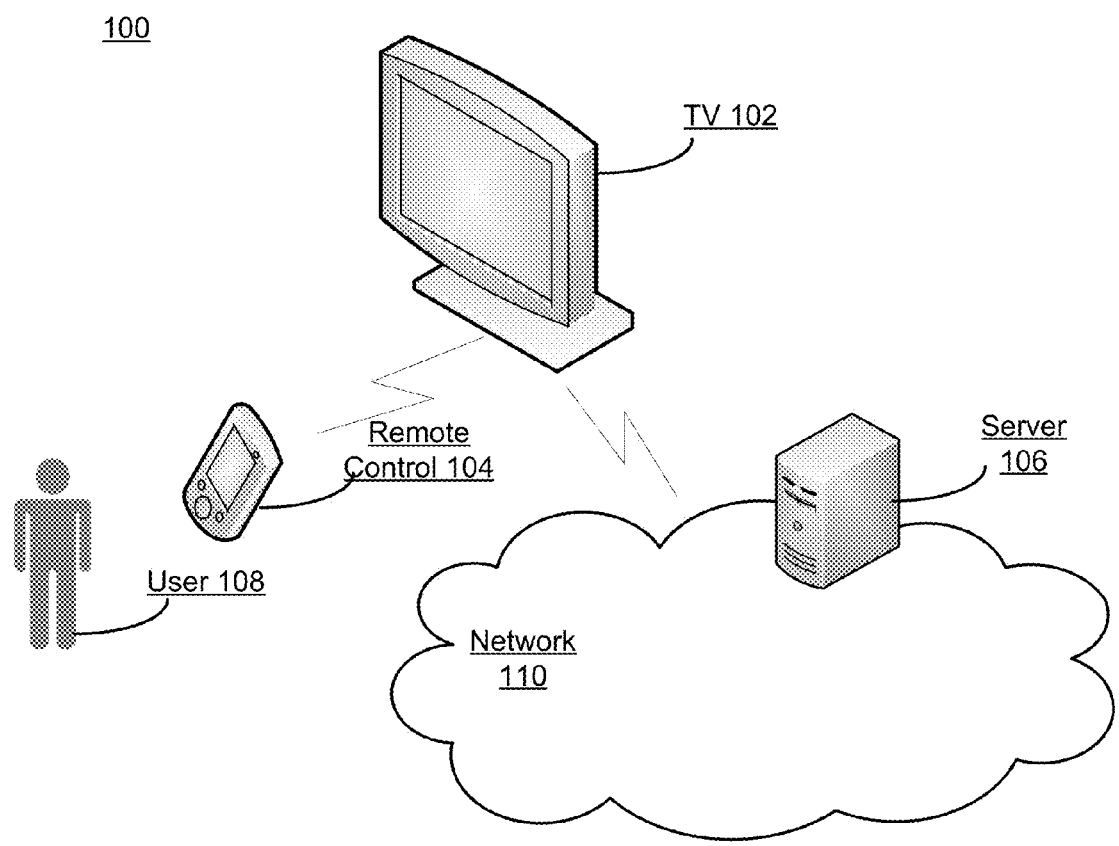
FIG. 1 illustrates an exemplary environment incorporating certain embodiments of the present invention.

FIG. 1 illustrates an exemplary environment 100 incorporating certain embodiments of the present invention. As shown in FIG. 1, environment 100 includes a television set (TV) 102, a remote control 104, a server 106, a user 108, and a network 110. Other devices may also be included.

TV 102 may include any appropriate type of TV, such as plasma TV, LCD TV, projection TV, non-smart TV, or smart TV. TV 102 may also include other computing system, such as a personal computer (PC), a tablet or mobile computer, or a smart phone, etc. Further, TV 102 may be any appropriate content-presentation device capable of presenting multiple programs in one or more channels, which may be controlled through remote control 104.

Remote control 104 may include any appropriate type of remote control that communicates with and controls the TV 102, such as a customized TV remote control, a universal remote control, a tablet computer, a smart phone, or any other computing device capable of performing remote control functions. Remote control 104 may also include other types of devices, such as a motion-sensor based remote control, or a depth-camera enhanced remote control, as well as simple input/output devices such as keyboard, mouse, and voice-activated input device, etc.

Further, the server 106 may include any appropriate type of server computer or a plurality of server computers for providing personalized contents to the user 108. The server 106 may also facilitate the communication, data storage, and data processing between the remote control 104 and TV 102. TV 102, remote control 104, and server 106 may communicate with each other through one or more communication networks 110, such as cable network, phone network, and/or satellite network, etc.

The user 108 may interact with TV 102 using remote control 104 to watch various programs and perform other activities of interest, or the user may simply use hand or body gestures to control TV 102 if motion sensor or depth-camera is used by TV 102. The user 108 may be a single user or a plurality of users, such as family members watching TV programs together.

Figure 2:
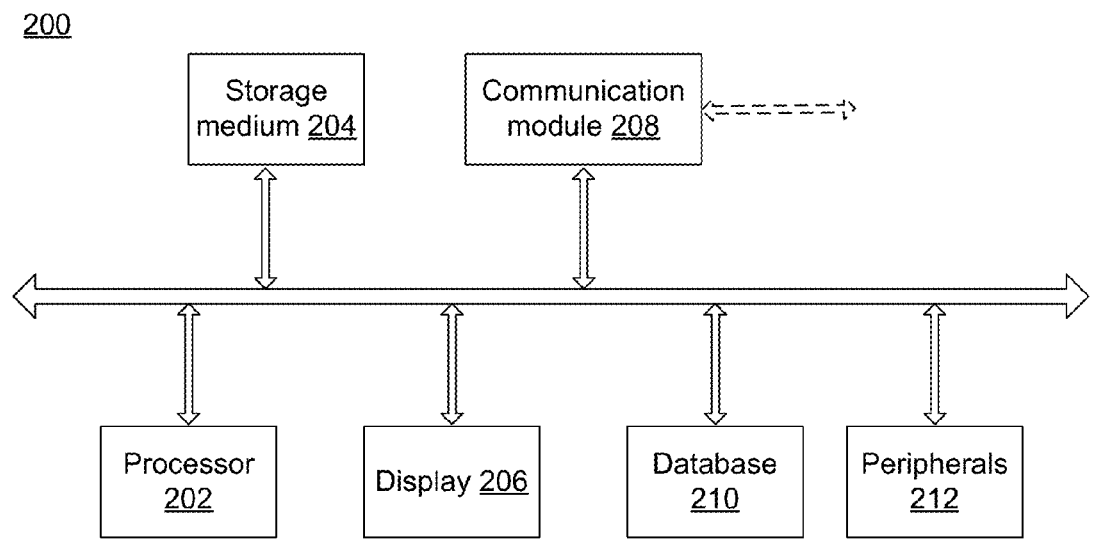
FIG. 2 illustrates an exemplary computing system consistent with the disclosed embodiments.

TV 102, remote control 104, and/or server 106 may be implemented on any appropriate computing circuitry platform. FIG. 2 shows a block diagram of an exemplary computing system 200 capable of implementing TV 102, remote control 104, and/or server 106.

As shown in FIG. 2, computing system 200 may include a processor 202, a storage medium 204, a display 206, a communication module 208, a database 210, and peripherals 212. Certain devices may be omitted and other devices may be included.

Processor 202 may include any appropriate processor or processors. Further, processor 202 can include multiple cores for multi-thread or parallel processing. Storage medium 204 may include memory modules, such as ROM, RAM, flash memory modules, and mass storages, such as CD-ROM and hard disk, etc. Storage medium 204 may store computer programs for implementing various processes, when the computer programs are executed by processor 202.

Further, peripherals 212 may include various sensors and other I/O devices, such as keyboard and mouse, and communication module 208 may include certain network interface devices for establishing connections through communication networks. Database 210 may include one or more databases for storing certain data and for performing certain operations on the stored data, such as database searching.

Figure 3:
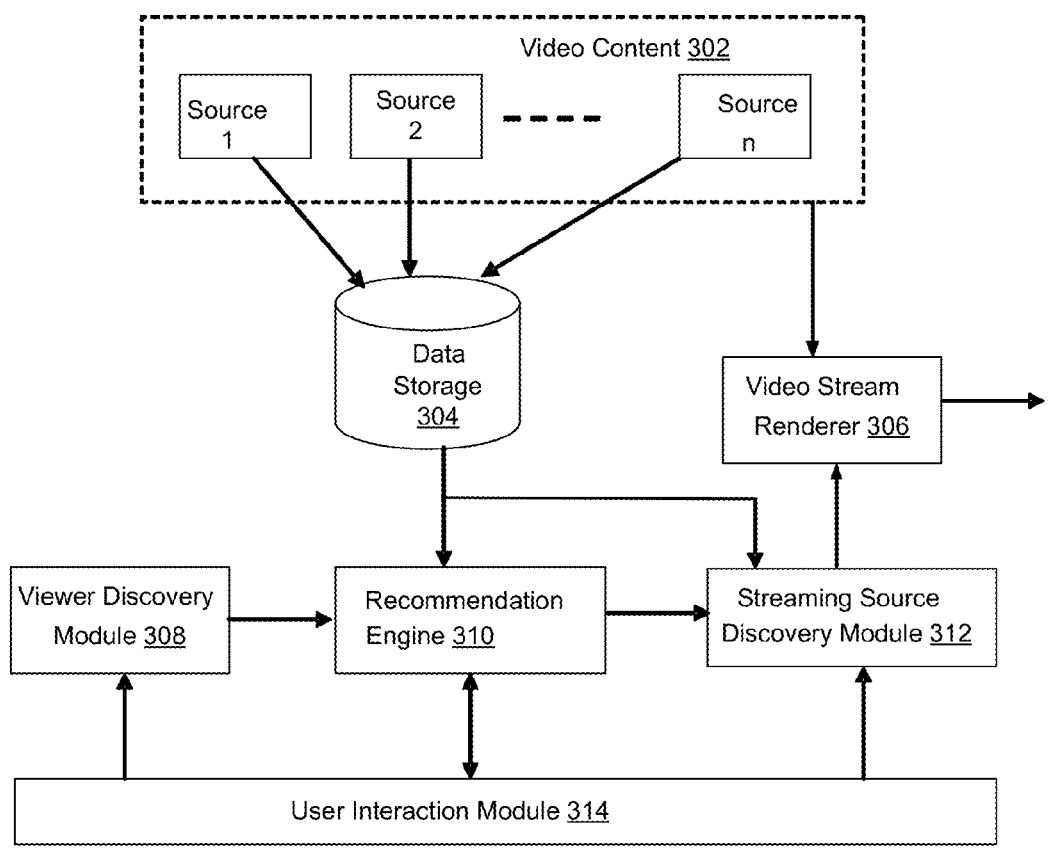
FIG. 3 illustrates an exemplary personalized content delivery system consistent with the disclosed embodiments.

FIG. 3 illustrates an exemplary personalized content delivery system 300 consistent with the disclosed embodiments. As shown in FIG. 3, personalized content delivery system 300 includes video content 302, data storage 304, video stream renderer 306, viewer discovery module 308, recommendation engine 310, streaming source discovery module 312, and user interaction module 314. Certain components may be omitted and other components may be added.

The video content 302 may include any appropriate type of source for video contents and may contain various video sources (i.e., video source 1, video source 2, ... video source n). The contents from the video content 302 may include both video data and meta-data.

The Further, data storage 304 may include any appropriate storage medium (e.g., storage medium 204, database 210) to store video data and/or the metal-data of the video data. The video data may be coded before being stored in the data storage 304 and the stored video data may be decoded before being provided to the video stream renderer 306, but the meta-data may be stored in the data storage 304 for the recommendation engine usage.

The viewer discovery module 308 detects the possible viewers in front of the TV via a number of clues obtained by different sensors and through multiple smart devices, such that the system 300 can get the user identity in an easy and nature way. For example, the viewer discovery module 308 may detect a viewer by communicating with the viewer's personal device, by face recognition, by remote control usage pattern, and/or by TV viewing history, etc.

Based on the viewer identities from the viewer discovery module 308, the recommendation engine 310 may select personalized content to recommend to viewer. That is, once the personalization detection is done, the recommendation engine 310 may be configured to handle video content selection and to recommend preferred contents for the user 108. In certain embodiments, the recommendation engine 310 may further provide video content selection and recommendation information to streaming source discovery module 312 to stream video data to the user based on personalized user configurations.

Based on information from the recommendation engine 310 and video meta-data from data storage 304, the streaming source discovery module 312 may select the best source to obtain the video stream and control the video stream renderer 306 to playback the video streaming from the selected source. That is, the streaming source discovery module 312 may implement a user-adaptive streaming source discovery mechanism to enable the streaming data source selection optimization according to various constraints from the user 108, such as a home network condition, a terminal condition, a video-on-demand (VOD) service subscription, etc., and/or from a service provider or server 106, such as a regional constraint and cloud computational capability constraint, etc.

The user interaction module 314 may be configured to implement interactions between the system 300 and the user 108 based on any appropriate interaction mechanisms, such as remote control, sensors, and/or gesture/voice control, etc.

Further, the video stream renderer 306 may be configured to generate personalized video stream and to transmit the personalized video stream to the user 108 (e.g., to TV 102) based on the configuration from the streaming source discovery module 312 and from video content 302.

In certain embodiments, the video stream renderer 306 together with the streaming source discovery module 312 may deliver the personalized video stream over a particular program channel on TV 102. That is, for a particular user 108, a program channel can be configured to adaptively discover the user's viewing preferences, to recommend video contents to the user, and to deliver the personalized video contents to the user over that particular channel.

In other words, from the user's perspective, the personalization process is transparent and the user can view the personalized video contents, from all or certain sources available to the user, without interrupts by ads. The better condition (e.g., more available sources) the user has, the better quality of personalized contents (e.g., chosen from more available sources) are shown on the screen, without any significant user input.

Figure 4:
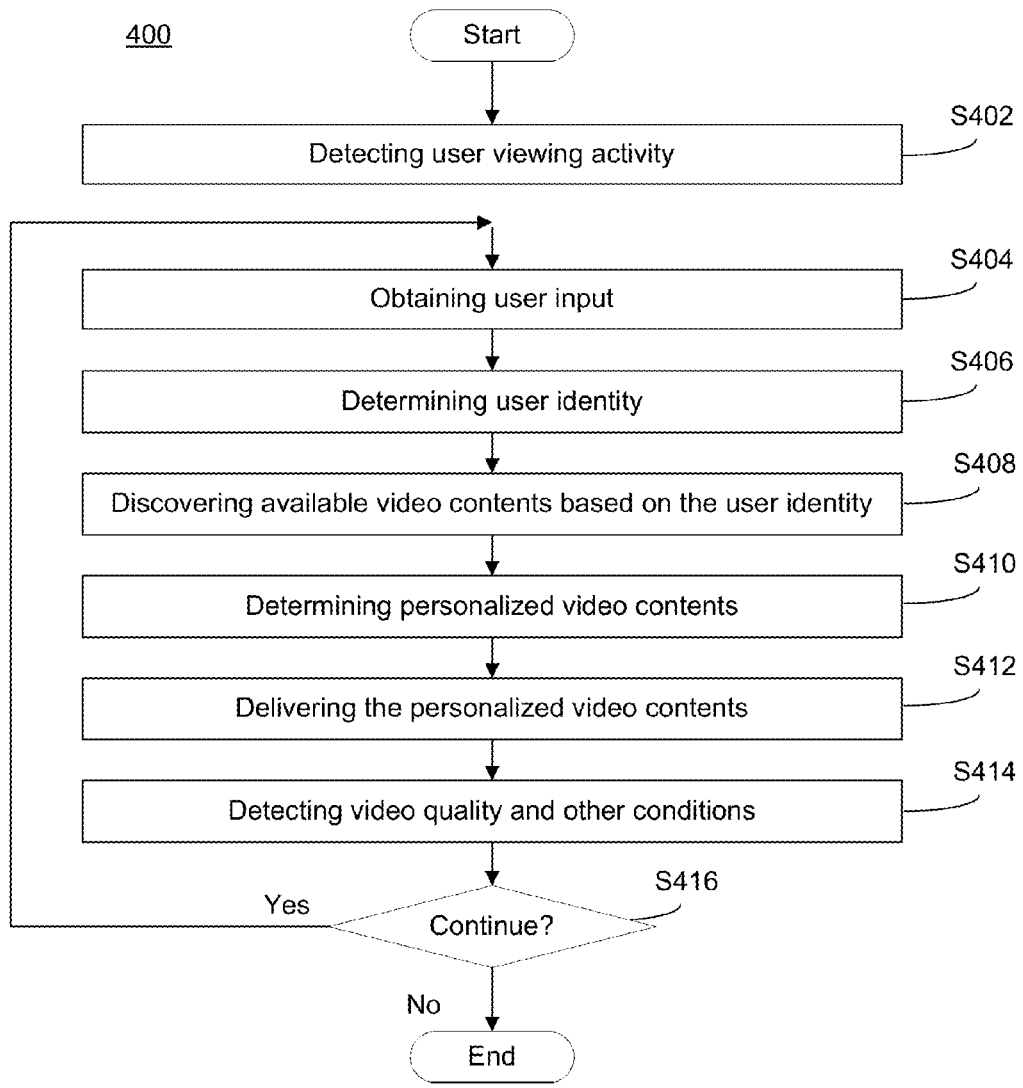
FIG. 4 illustrates an exemplary personalized content delivery process consistent with the disclosed embodiments.

In operation, personalized content delivery system 300 may perform certain processes to deliver personalized contents to users. FIG. 4 illustrates an exemplary process 400 for delivering personalized contents to users.

As shown in FIG. 4, at the beginning, a user viewing activity may be detected (S402). For example, the user may turn on TV 102, pick up remote control 104, or use other devices (e.g., a smart phone, a tablet, etc.) to communicate with TV 102 or server 106. After the user activity is detected, any user input may be obtained (S404).

For example, if the user a wearable device, such as a smart phone, the device may interact with TV 102 to exchange certain user data. If the user uses a remote control or other input device, the input from the remote control or other input device may be obtained. If the user just turns on TV, certain program selection of the user may also be obtained.

Further, the identity of the user or users may be determined (S406). For example, when the users have wearable devices, such as a bracelet, watch or a mobile phone, the devices may be wirelessly connected to the TV 102 and the user identity may be communicated to TV 102. This way, the user identity can be easily determined. The user identity may also be easily determined if TV 102 is equipped with face or user recognition technology. Further, when a smart remote control used by a user, the user's identity who is using the remote control can be obtained with reasonably high accuracy. However, other viewers who maybe also sitting there cannot be detected. When a single user has a wearable device, the TV 102 has a face or user recognition module, and/or the user also uses a remote control, the single may have multiple identities.

When there are no supporting devices available, the TV viewer information is not traceable but the viewing history may reveal certain viewing patterns. The identity of the user may be determined based on the content correlation and relevance. For example, a user typically watches soap every other day, but sometimes he/she controls the remote control, and sometimes others take control. In such a case, the viewing patterns of a user can be obtained by performing a pattern mining.

In certain embodiments, the probability of a user following existing trends (i.e., viewing pattern) can be represented with a mixture Gaussian model, as:

$$P(X_t) = \sum_{i=1}^{K} w_{i,t} \frac{1}{\sqrt{2\pi}\,\sigma_i} e^{-\frac{1}{2}(X_t - \mu_{i,t})^T \Sigma^{-1}(X_t - \mu_{i,t})}, \quad (1)$$

where t represents the time information, K represents the number of patterns related to the current program, $w_{i,t}$ is the normalized weight among patterns, $\mu_i$ and $\sigma_i$ are the mean and the standard deviation of the ith distribution. On the other hand, an adaptive threshold mechanism can be adopted to determine whether the probability is high enough to include a user into the current viewer list. This way, the user identity can be finally determined.

After the user identity is determined, the available video contents may be discovered or determined based on the user identity (S408). That is, a content discovery may be performed by the system 300 (e.g., server 106). The available desired video contents (e.g., ads-free contents) may be divided into 2 categories: free content uploaded by users (e.g., Youtube video) and premium VOD contents based on subscription.

As different user may have subscribed different VOD services, different content pools may be used according to the user's content subscription. System 300 may determine the access level that the user may have, and then provide scalable content access depending on their subscription. That is, the system 300 may provide different modes for the contents in the content pools.

For example, system 300 may use a base mode for free contents and an advanced mode for premium contents. In the base mode, groups of free content are available for every user; while in the advanced mode, the user may be provided with premium content if the user has the access (e.g., subscription). The system 300 (e.g., server 106) may discover a pool of contents that a specific user may have access and thus grant scalable content pool access to the users of system 300.

Further, the system 300 may determine personalized video contents for recommendation to the user or users (S410). For example, for a single user, the system 300 may analyze the user's viewing pattern and available video contents and make a recommendation on user's preferred video programs. However, for multiple users or a single user with multiple identities, system 300 may need to integrate or merge the multiple identities from multiple users or a single user to determine preferred contents corresponding to the multiple identities.

When users have wearable devices, the identities of the users may be determined based on communications between the wearable devices and the TV 102. Or the user identity may be detected by TV 102 based on certain face or user recognition technologies. The possibility of a particular user watches a particular program may be determined as well. An example is shown in Table 1, where the rows are possible users denoted by $u_1, u_2, \ldots$, and the columns are programs denoted as $p_1, p_2, \ldots$, and the possibility $T(p_i, u_j)$ can be represented by $$T(p_i, u_j) = \begin{cases} 1 & p_i \text{ is viewed by } u_j \text{ for sure} \\ 0 & \text{otherwise.} \end{cases} \quad (2)$$

TABLE 1

T(P, U) function for determined identities

| T(p,u) | $p_1$ | $p_2$ | $p_3$ | $p_4$ | $p_5$ | $p_6$ | $p_7$ | $p_8$ | ... | ... | $p_{n-1}$ | $p_n$ |
|---|---|---|---|---|---|---|---|---|---|---|---|---|
| $u_1$ |  | 1 |  | 1 |  | 1 |  | 1 |  |  |  |  |
| $u_2$ |  |  |  |  |  |  |  |  |  |  |  |  |
| $u_3$ | 1 |  | 1 |  | 1 |  | 1 |  |  |  |  |  |
| $u_4$ | 1 | 1 | 1 | 1 |  | 1 | 1 | 1 |  |  |  |  |
| $u_5$ |  |  |  |  |  |  |  |  |  |  |  |  |

It should be noted that $T(p_i, u_j)=0$ does not necessary to mean $u_j$ is not viewing $p_i$ because not all users (e.g., family members) are guaranteed to have wearable devices and some members may not wear them at this moment, thus even a member (having the specific wearable devices) is currently watching TV, he/she may get $T(p,u)=0$ if the device is not presented at the scene. In other words, the information collected via $T(p,u)$ function maybe incomplete.

Further, where a smart remote control is used a user, the user's identity who is using remote can be obtained with reasonable high accuracy, however, other viewers who maybe also sitting there cannot be detected. As shown in Table 2, where $T(p,v)$ function is used to represent the probability that a user $v_j$ is currently using remote control in watching program $p_i$. In most cases, the user with higher probability is more likely to be the correct user.

TABLE 2

T(P, V) function for reasonably accurate identity

| T(p, v) | $p_1$ | $p_2$ | $p_3$ | $p_4$ | $p_5$ | $p_6$ | $p_7$ | $p_8$ | ... | ... | $p_{n-1}$ | $p_n$ |
|---|---|---|---|---|---|---|---|---|---|---|---|---|
| $v_1$ | 0.5 | 0.9 |  | 0.5 |  | 0.9 |  | 0.3 |  |  |  |  |
| $v_2$ |  |  |  | 0.1 |  |  |  |  |  |  |  |  |
| $v_3$ | 0.2 |  | 0.1 |  | 0.95 |  | 0.5 |  |  |  |  |  |
| $v_4$ | 0.2 | 0.1 | 0.9 | 0.3 |  | 0.1 | 0.5 | 0.7 |  |  |  |  |
| $v_5$ | 0.1 |  |  |  | 0.05 |  |  |  |  |  |  |  |

However, it may imply that the smart remote control may be not as accurate as the wearable devices. The major difference between the smart remote control and the wearable device is that the wearable device is a personal device while the smart remote control may be shared by family members.

Further, when there are no supporting devices (e.g., wearable device, smart remote control) available, the TV viewer information is not traceable but the viewing history may reveal certain viewing patterns. The full list of $p_i$ represents all the TV programs that have been watched by the family or a plurality of users.

The system 300 may process a combination of users under various device conditions (e.g., wearable, smart remote control, TV viewing history, etc.), and determine who is watching TV program $p_n$ given the data collected during the past TV program $(p_1, p_2, \ldots, p_{n-1})$ watching experiences. That is, the system 300 may first merge the identities of the users and then determine the current user(s) in viewing program $p_n$.

It can be provided that $P=\{p_1, p_2, \ldots p_n\}$ represents all the programs that the TV has been shown on screen (e.g. TV viewing history), $U=\{u_1, u_2, \ldots, u_s\}$ all the users detected having wearable devices that can specify his/her identity when watching TV (which does not include the ones who have such devices but never used in front of the TV), i.e., with a definite identity, $V=\{v_1, v_2, \ldots, v_t\}$ represents all the users detected using the smart remote control, where t should be close to the number of active TV viewers in a family given the detection accuracy of the smart remote can be maintained in a high level.

In addition, T(P, U) is used to represent the relationship between P and U as specified in Equation (2), and T(P,V) is used to represent the relationship between P and V as specified in Table 2. Thus, a merged user set $W=\{w_1, w_2, \ldots, w_r\}$ that W belongs to U+V and the function T(P, W) may be determined. More specifically, it is to find the pairs of $\{u_i, v_j\}$ that map to the same user in W. If S ($u_i$, $v_j$) denotes the similarity between two users $u_i$ and $v_j$ according to their TV program viewing sequences, and $u(w_i)$ and $v(w_i)$ denote the corresponding user of merged user $w_i$ in U and V, then the problem of finding the pairs of $\{u_i, v_j\}$ can be formalized as follows:

$$\text{Minimize} \frac{|W|}{\sum_{k=1}^{|U|+|V|-|W|} S[u(w_k), v(w_k)]}, \quad (3)$$

Such that all k=1, ..., |U|+|V|−|W|, $S[u(w_k),v(w_k)] \geq Th$, where Th is a threshold to make sure the merged users are similar enough.

Considering that the sizes of sets U and V are relatively small (e.g., typically single digit numbers), the solution for Equation (3) may be easily calculated as long as the $S[u(w_k), v(w_k)]$ can be obtained.

For the same user (before and after merge), the record in T(P, U) shows the program that he/she had watched when wearing the wearable devices, and the record in T(P,V) shows the program that he/she had watched when he used the remote control. There may be overlapping part indicating the program watched when he/she used the remote control as well as having the wearable device. Considering an active user in a family with size in the range of 3-5 members, the overlapping part should be sufficiently significant to be detected. In such a context, the S function calculation can be mapped into a traditional sequence alignment problem, which can use Needleman-Wunsch algorithm to quickly calculate the S function using dynamic program.

More specifically, let $A=a_1a_2\ldots a_n$ and $B=b_1b_2\ldots b_n$ be the TV watching histories of two users over a period of time, where $a_i$ (i=1, ..., n) and $b_j$ (j=1, ... n) belong to a set of all TV programs ("not watching any TV" is treated as a special TV program). Assuming that the similarity between any two TV programs can be quantified reasonably, partial segments, $A_i$ and $B_j$ can be defined as the first i and j elements of A and B, respectively, i.e., $A_i=a_1a_2\ldots a_i$ and $B_j=b_1b_2\ldots b_j$ (1≤i≤n and 1≤j≤n); and S(i, j) can be defined as the maximum score among all alignments of $A_i$ and $B_j$.

The dynamic programming algorithm to align A and B may be used as follows:
Initialization:

$0^{th}$ row of $S(i,j)$: $S(0,j)=d \times j, j=0, 1, 2, \ldots, n$ $0^{th}$ column of $S(i,j)$: $S(i,0)=d \times i, i=1, 2, \ldots, n$ Recursion (for 1≤i≤n and 1<j≤n):

$$S(i,j)=\max[S(i-1,j-1)+\text{Similarity}(a_i,b_j), S(i,j-1)+d, S(i-1,j)+d] \quad (4)$$

In the above description, d represents the similarity between any real TV program and "not watching any TV," which can be reasonability set as 0 or a negative value; and Similarity($a_i$, $b_j$) represents the similarity between programs $a_i$ and $b_j$ (which equals to d when either $a_i$ or $b_j$ corresponds to "not watching any TV"). The similarity between programs $a_i$ and $b_j$ can be assessed from multiple perspectives, e.g., based on time, station, content, performers.

After the W is obtained, the T(P, W) can be obtained by $$T(p_i,w_k)=\max(T(p_i,u(w_k)),T(p_i,v(w_k))). \quad (5)$$

Table 3 illustrates the merged user obtained by merging Table 1 and Table 2.

TABLE 3

An example of T(P, W) function

| T(p, v) | $p_1$ | $p_2$ | $p_3$ | $p_4$ | $p_5$ | $p_6$ | $p_7$ | $p_8$ | ... | ... | $p_{n-1}$ | $p_n$ |
|---------|-------|-------|-------|-------|-------|-------|-------|-------|-----|-----|-----------|-------|
| $w_1$   | 0.5   | 1     |       | 1     |       | 1     |       | 1     |     |     |           |       |
| $w_2$   |       |       |       |       | 0.1   |       |       |       |     |     |           |       |
| $w_3$   | 1     |       | 1     |       | 1     |       | 1     |       |     |     |           |       |
| $w_4$   | 1     | 1     | 1     | 1     |       |       | 1     | 1     | 1   |     |           |       |
| $w_5$   | 0.1   |       |       |       | 0.05  |       |       |       |     |     |           |       |

Thus, based on merged user identities, the programs may be selected as the preferred for recommendation to the user or users. The user or users may select any recommended video contents to watch, or may wait for the recommended contents to start without any further action or selection.

Returning to FIG. 4, after determining the personalized video contents (S410), based on the content recommendation and/or user selection, the system 300 may deliver the personalized video contents to the user (S412). For example, the system 300 may generate video stream based on configuration information on the user identity and recommendation and from a particular content pool or pools. The video stream may then be transmitted to the TV 102 and the user or users. TV 102 may present the video stream in a single dedicated channel for the personalized contents. That is, the personalized contents may be recommended and presented in a single channel such that the user can view the preferred programs without moving from channel to channel. Of course, multiple channels may also be used to present the personalized contents.

In addition, the video stream may be generated based on certain conditions from the user or users. For example, in regions with low network bandwidth, the high-definition (HD) content may be unsuitable, and transcoding may be performed by server 106 to guarantee the received video streaming can playback smoothly and in a reasonable viewing condition. Other conditions may also be used to configure the video stream.

Further, additionally or optionally, the system 300 may detect video quality and other related conditions (S414). For example, the system 300 may probe the network condition of a household and the capability of the devices that the family members are using, thus the constraints of streaming quality and content resolution are considered in the recommendation content selection. Such conditions are feedback to the system 300 such that the contents can be configured within the constraint of the conditions.

The system 300 may also determine whether the user continues viewing the personalized content channel (S416). If system 300 determines that the user continues the personalized content delivery (S416, Yes), the process 400 continues from S404. On the other hand, if system 300 determines that the user does not want to continue the personalized content delivery (S416, No), the process 400 completes.

By using the disclosed systems and methods, advantageous personalized content delivery applications may be implemented to replace the current content model with a no-fee model by using content discovery technology built on top of the possible available on-demand streaming video subscriptions of the users.

The disclosed systems and methods provide a new scheme of TV channel with a unique combination of personalization technology, recommendation, and scalable content discovery and delivery technology. The realized content channel is commercial free as well as premium free, thus enables the user to watch program after program without commercial advertisement interruption. The program recommended to the user is obtained by a data mining engine which analyzes the user's past view history as well as the content pool and similar user's selections. For certain users, the only button in remote control that requires them to press is the power button to turn on TV and turn off at the end, as the content channel can guide the user to a world of favorable content and enjoy the experience without interaction to TV.

Other applications, advantages, alternations, modifications, or equivalents to the disclosed embodiments are obvious to those skilled in the art.

What is claimed is:

1. A method for a personalized content delivery system, comprising:
    detecting a viewing activity on a content-presentation device capable of presenting multiple programs in one or more channels;
    determining a plurality of user identities based on a plurality of separate user identity determining means, including at least a first user identity based on a wearable device of an individual user, a second user identity based on viewing history of the plurality of user identities, and a third identity determined by a usage of a remote control of the content-presentation device, wherein the first user identity is determined by a communication between the wearable device and the content-presentation device, and the second user identity is determined by the viewing history of the multiple programs in one or more channels;
    merging the plurality of user identities using a statistical algorithm to determine a target user from the plurality of user identities;
    discovering available video contents for the target user;
    determining personalized video contents for recommendation to the target user based on the available video contents;
    recommending the determined personalized video contents to the target user; and
    delivering the recommended personalized video contents to the target user such that the personalized video contents are presented on the content-presentation device,
    wherein merging the plurality of user identities further includes:
        determining function between the multiple programs and users having wearable devices by, provided that $P=\{p_1, p_2, \ldots p_n\}$ represents the multiple programs, n is a natural number, and $U=\{u_1, u_2, \ldots u_s\}$ represents the users having wearable devices, s is a natural number, setting T(P, U) to represent the function between P and U;
        determining function between the multiple programs and users using the smart remote control by, provided that $V=\{v_1, v_2, \ldots v_t\}$ represents the users using the smart remote control, and t is a natural number, setting T(P, V) to represent the function between P and V;
        merging the function between the multiple programs and users having wearable devices and the function between the multiple programs and users using the smart remote control, based on the viewing history of all users, to determine the target user as a user having most similarity between the users having wearable devices and the users using the smart remote control by:
            generating a merged user set $W=\{w_1, w_2, \ldots w_r\}$ that W belongs to U+V, wherein r is a natural number; and
            finding a pair of $\{u_i, v_j\}$ that map to the same user in W such that the same user is determined as the target user, wherein i and j are natural numbers.

2. The method according to claim 1, further including:
    obtaining user input from a user after detecting the viewing activity.

3. The method according to claim 1, wherein discovering available video contents further includes:
    discovering a first type of contents available for general users;
    discovering a second type of contents available based on a subscription of the target user; and
    generating a content pool including the first type of contents and the second type of contents for the target user.

4. The method according to claim 1, wherein delivering the recommended personalized video contents further includes:
    delivering the recommended personalized video contents to the target user such that the personalized video contents are presented on the content-presentation device on a single dedicated channel.

5. The method according to claim 1, further including:
    detecting a video streaming quality condition; and
    feeding back the detected video streaming quality condition to configure the delivering the recommended personalized video contents.

6. A personalized content delivery system, comprising:
    a viewer discovery module to:
        detect a viewing activity on a content-presentation device capable of presenting multiple programs in one or more channels,
        determine a plurality of user identities based on a plurality of separate user identity determining means, including at least a first user identity based on a wearable device of an individual user, a second user identity based on viewing history of the plurality of user identities, and a third identity determined by a usage of a remote control of the content-presentation device, wherein the first user identity is determined by a communication between the wearable device and the content-presentation device, and the second user identity is determined by the viewing history of the multiple programs in one or more channels, and merge the plurality of user identities using a statistical algorithm to determine a target user from the plurality of user identities by applying respective weights on the plurality of separate user identity determining means;

a streaming source discovery module to discover available video contents for the target user, a recommendation engine to determine personalized video contents for recommendation to the target user based on the available video contents, and to recommend the determined personalized video contents to the target user; and a video stream renderer to deliver the recommended personalized video contents to the target user such that the personalized video contents are presented on the content-presentation device;

wherein, to merge the plurality of user identities, the viewer discovery module is further to:

determine function between the multiple programs and users having wearable devices by, provided that $P=\{p_1, p_2, \ldots p_n\}$ represents the multiple programs, n is a natural number, and $U=\{u_1, u_2, \ldots u_s\}$ represents the users having wearable devices, s is a natural number, setting T(P, U) to represent the function between P and U;

determine function between the multiple programs and users using the smart remote control by, provided that $V=\{v_1, v_2, \ldots v_t\}$ represents the users using the smart remote control, and t is a natural number, setting T(P, V) to represent the function between P and V; and merge the function between the multiple programs and users having wearable devices and the function between the multiple programs and users using the smart remote control, based on the viewing history of all users, to determine the target user as a user having most similarity between the users having wearable devices and the users using the smart remote control by:

generating a merged user set $W=\{w_1, w_2, \ldots w_r\}$ that W belongs to U+V, wherein r is a natural number; and finding a pair of $\{u_i, v_j\}$ that map to the same user in W such that the same user is determined as the target user, wherein i and j are natural numbers.

7. The personalized content delivery system according to claim 6, further including:

a user interaction module configured to obtain user input from a user after detecting the viewing activity.

8. The personalized content delivery system according to claim 6, wherein the streaming source discovery module is further to:

discover a first type of contents available for general users;

discover a second type of contents available based on a subscription of the target user; and generate a content pool including the first type of contents and the second type of contents for the target user.

9. The personalized content delivery system according to claim 6, wherein the video stream renderer is further to:

delivering the recommended personalized video contents to the target user such that the personalized video contents are presented on the content-presentation device on a single dedicated channel.

10. The personalized content delivery system according to claim 6, wherein the video stream renderer is further to:

detect a video streaming quality condition; and feed back the detected video streaming quality condition to configure the delivering the recommended personalized video contents.

* * * * *